United States Patent
Horesh et al.

(10) Patent No.: US 11,595,334 B1
(45) Date of Patent: Feb. 28, 2023

(54) TRAINING AND USING MACHINE LEARNING MODELS TO PLACE TARGETED MESSAGES IN SOFTWARE APPLICATIONS

(71) Applicant: INTUIT INC., Mountain View, CA (US)

(72) Inventors: Yair Horesh, Kfar-Saba (IL); Aviv Ben Arie, Ramat Gan (IL); Sheer Dangoor, Ramat-Gan (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/848,100

(22) Filed: Jun. 23, 2022

(51) Int. Cl.
| | |
|---|---|
| G06F 15/16 | (2006.01) |
| H04L 51/063 | (2022.01) |
| H04L 51/214 | (2022.01) |
| H04L 51/02 | (2022.01) |

(52) U.S. Cl.
CPC .......... H04L 51/063 (2013.01); H04L 51/02 (2013.01); H04L 51/214 (2022.05)

(58) Field of Classification Search
CPC ...... H04L 51/02; H04L 51/063; H04L 51/214
USPC ....................................................... 709/204
See application file for complete search history.

(56) References Cited

U.S. PATENT DOCUMENTS

| 10,600,080 | B1 * | 3/2020 | Andersen | G06F 16/435 |
| 11,037,195 | B1 * | 6/2021 | Puri | G06Q 30/0255 |
| 2004/0019650 | A1 * | 1/2004 | Auvenshine | G06F 16/00 706/20 |
| 2021/0149930 | A1 * | 5/2021 | Alvarez | G06F 16/29 |

OTHER PUBLICATIONS

Sun, Zhe. "Industry2vec: an Implementation for Industry Code Vector Representation". Sep. 6, 2018. Pages 1-10. (Year: 2018).*

* cited by examiner

Primary Examiner — Imad Hussain
(74) Attorney, Agent, or Firm — Patterson + Sheridan, LLP (57) ABSTRACT

Certain aspects of the present disclosure provide techniques for placing targeted messages in communications within a software application using machine learning models. An example method generally includes retrieving, from a repository, a data set of targeted messages. For each respective targeted message in the data set of targeted messages, an effectiveness score for a party associated with the respective targeted message, a distance score between the party associated with the respective targeted message and a host party, and a match score between the party associated with the respective targeted message and the host party. Based on the effectiveness score, the distance score, and the match score for each respective targeted message in the data set of targeted messages, a message is selected to be included in one or more communications by the host party. The one or more communications including the selected message are generated and output for transmission.

20 Claims, 4 Drawing Sheets

TRAINING AND USING MACHINE LEARNING MODELS TO PLACE TARGETED MESSAGES IN SOFTWARE APPLICATIONS

INTRODUCTION

Aspects of the present disclosure relate to machine learning models, and more specifically training and using machine learning models to place targeted messages in communications generated by users of a software application.

BACKGROUND

Software applications are generally deployed for use by many users for the performance of a specific function. These applications may be deployed as web applications accessible over the Internet or a private network or as desktop applications including static components executed from a local device and dynamic components executed from content retrieved from a network location. These applications can include financial applications, such as tax preparation applications, accounting applications, personal or business financial management applications, or the like; social media applications; other electronic communications applications; and so on.

Some applications may include components that allow targeted messages to be presented to a user while the user is interacting with the application (e.g., in an interstitial page between different components of a web application, in a dedicated messaging panel in an application, in electronic communications sent to the user after a user begins interacting with the application, etc.). These messages may be textual messages that require a minimal amount of overhead to add to network communications between a client device and an application. However, some messages may include audio and/or visual components which may impose more overhead for transmitting the message to a client device.

In some cases, the targeted messages presented to a user may be randomly selected by a message placement engine. These targeted messages, however, may not be relevant to the user. Even where a targeted message may be relevant to a user, the user may not actually qualify for the content included in the targeted message. In either case, i.e., delivering targeted messages to a user that are not relevant to the user or targeted messages including content that a user is not qualified for, resources (e.g., network bandwidth, user data caps, power usage (e.g., when the messages include multimedia content such as video or audio content), etc.) are wasted, which could be used for other productive purposes.

Thus, techniques are needed for presenting targeted messages that are relevant to a user of the software application.

BRIEF SUMMARY

Certain embodiments provide a computer-implemented method for placing targeted messages in communications within a software application using machine learning models. An example method generally includes retrieving, from a repository, a data set of targeted messages. Generally, each respective targeted message in the data set of targeted messages is associated with information identifying properties of the respective targeted message and a party associated with the respective targeted message. For each respective targeted message in the data set of targeted messages, an effectiveness score for the party associated with the respective targeted message, a distance score between the party associated with the respective targeted message and a host party for the respective targeted message, and a match score between the party associated with the respective targeted message and a host party for the respective targeted message are generated. Based on the effectiveness score, the distance score, and the match score for each respective targeted message in the data set of targeted messages, a message is selected to be included in one or more communications by the host party. The one or more communications including the selected message are generated and output for transmission.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

In various software applications, various messages may be presented to users of the software application. Because these messages may be intrusive and impose resource costs (e.g., bandwidth, processing, power usage, etc. for delivering messages to users of the software application), targeting techniques are generally used in an attempt to deliver relevant messages to a user. Generally, a relevant message may be a message that the user is likely to be interested in receiving and is qualified to receive. By delivering these "relevant" messages to a user, network bandwidth and other compute resources may be more efficiently utilized, as targeting techniques may generally reduce the likelihood that irrelevant messages are presented to a user of the software application.

Generally, targeted messages may be most effective when delivered to parties that are likely to be interested in these targeted messages. However, in many cases, parties associated with these targeted messages may be unable to effectively present targeted messages to relevant users for a variety of reasons. For example, some techniques by which targeted messages may be placed may be both resource-intensive and ineffective. Further, because many parties associated with these targeted messages may have limited audiences due to being located in a limited geographic area, platforms that allow for placement of targeted messages across large geographic areas may be ineffective, as these targeted messages may regularly be presented to users who are outside of these limited geographic areas and thus may be, by definition, irrelevant to the users who are outside of these limited geographic areas.

Aspects of the present disclosure provide techniques for generating and presenting targeted messages to users (e.g., of a software application) based on machine learning models that identify host parties that can effectively place targeted messages for a party associated with these targeted message. As discussed in further detail herein, the machine learning models can determine whether a prospective host party will be an effective host for a targeted message based on similarities between the prospective host party and the party associated with the targeted message, historical metrics associated with targeted messages previously hosted by the prospective host party, and/or other metrics indicative of whether a prospective host party will be an effective host for the targeted messages. Because targeted messages may be placed for hosting by host parties using various effectiveness and similarity metrics for a host party, targeted messages may thus be placed for hosting with parties that are most likely to deliver these targeted messages to a relevant audience. Thus, aspects of the present disclosure improve the user experience of a software application by presenting targeted messages through hosts that are likely to present the targeted offer to relevant users. Further, by presenting targeted messages via hosts that are likely to present the targeted offer to relevant users, embodiments of the present disclosure may reduce the amount of bandwidth used in delivering application content to users of the software application.

Figure 1:
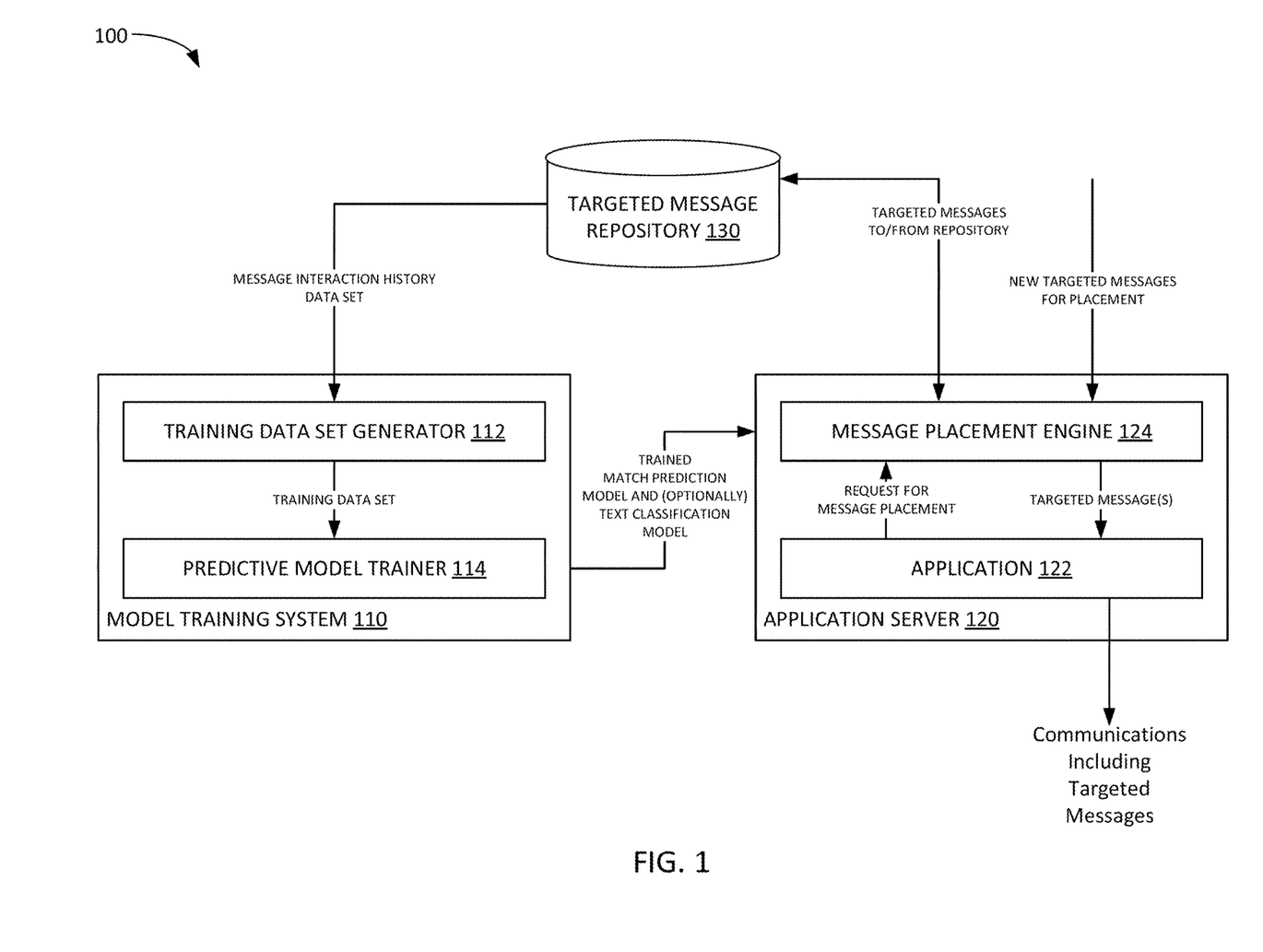
FIG. 1 depicts an example computing environment in which targeted messages are delivered to users of a software application based on machine learning models trained to identify hosts for targeted messages based on effectiveness, distance, and match scores associated with targeted messages.

Example Training Machine Learning Models and Placing Targeted Messages Using the Machine Learning Models FIG. 1 illustrates an example computing environment 100 in which targeted messages are delivered to users of a software application based on machine learning models trained to identify hosts for targeted messages based on effectiveness, distance, and/or match scores associated with targeted messages. As illustrated, computing environment 100 includes a model training system 110, and application server 120, and targeted message repository 130.

Model training system 110 generates training data sets from information associated with targeted messages previously placed by various parties through application 122 and trains machine learning models to analyze the content of targeted messages and predict matches between parties associated with a targeted message and prospective host parties for a targeted message. Model training system 110 may be any of a variety of computing devices that can generate training data sets and train predictive models based on these training data sets, such as a server computer, a cluster of computers, cloud computing instances, or the like. As illustrated, model training system 110 includes a training data set generator 112 and a predictive risk model trainer 114.

Training data set generator 112 may be configured to retrieve historical information (e.g., from targeted message repository 130) about targeted messages previously placed with various host parties (e.g., users of application 122) for presentation through application 122 and generate a training data set that can be used to train machine learning models to generate match scores predictive of a likelihood that a host party will be an effective host for a targeted message. The training data set may include features associated with different pairings of host parties and parties associated with a targeted message, labeled with an indication of whether a host party hosted a targeted message in one or more communications generated by the host party. For example, in a targeted advertising system, each entry in the training data set may include a plurality of features associated with both the party associated with a targeted message and a host party, such as sales volume over a defined period of time, industry information (e.g., as indicated in various standardized codes, such as a code from the North American Industry Classification System (NAICS)), an amount of overlap between the products offered for sale by the party associated with the targeted message and the host party, and the like.

Predictive model trainer 114 generally trains and deploys one or more machine learning models that message placement engine 124 can use to place targeted messages with host parties for inclusion in communications generated by these host parties and/or in messaging windows or panes in application 122. Generally, the one or more machine learning models include a match prediction model trained to generate a match score that predicts a likelihood that a host party will be an effective host for a targeted message. In some aspects, a match prediction model trained to generate such a match score may be a regression model trained based on the training data set generated by training data set generator 112. The regression model may be used to classify a pairing between a prospective party for hosting a targeted message and a party associated with the targeted message as a match (e.g., such that the prospective party is considered an appropriate party to host the targeted message) or a non-match (e.g., such that the prospective party is considered an inappropriate party to host the targeted message). In one embodiment, scores closer to 1 may be considered stronger matches, while scores closer to 0 may be considered stronger non-matches.

In some aspects, predictive model trainer 114 can also train a text classification model that examines the textual content associated with a targeted message and determines whether the targeted message includes inappropriate text that would disqualify the targeted message from placement through message placement engine 124. To train the text classification model, predictive model trainer 114 can use a training data set including text samples classified as appropriate and text samples classified as inappropriate. Text samples classified as appropriate may include text samples associated with previously placed targeted messages, while text samples classified as inappropriate may include text samples including words deemed inappropriate for inclusion in a communication, such as profanity, explicit content, or the like. The resulting text classification model may be trained to generate a confidence score indicative of whether an input text sample includes appropriate content. The confidence score generated by the text classification model may be used, as discussed in further detail below, to determine whether the targeted message can be placed for inclusion in communications generated by one or more host parties. The text classification model may be, for example, a bi-directional long short term memory (LSTM) model that is trained on both a forward pass through a text sample and a reverse pass through the text sample, a transformer model, or other machine learning models that can be used to classify a text sample as an appropriate text sample or an inappropriate text sample for inclusion in in communications generated by one or more host parties.

After training the match prediction model (and, in some aspects, the text classification model), the models may be deployed to an application server 120 for use in generating targeted messages for inclusion in communications generated by users of an application 122 executing on the application server 120. For example, as illustrated, the models may be deployed to a message generation engine 124 executing on or otherwise associated with application server 120.

Application server 120 generally hosts an application that may be accessed by users of the application and may provide a set of functions to users of the application. As illustrated, application server 120 includes an application 122 and message generation engine 124.

In some aspects, during execution of the application 122, users of application 122, who may serve as host parties for targeted messages, generate communications for transmission to other parties. Application 122 may, in turn, request that message generation engine 124 determine whether a targeted message should be included in these communications. For example, in an invoicing application, a communication may include an invoice generated for transmission to a customer of a user of application 122, and the targeted message placed in the communication may be a message that the user of application 122 has agreed to host in one or more communications.

Message placement engine 124 generally identifies potential targeted messages to be placed in communications generated by a user of application 122 and allows the user of application 122 to agree to place the targeted messages in communications generated through application 122. Generally, targeted messages that may be placed with users of application 122 may be initially received from a party who wishes to place these targeted messages with communications generated through application 122. The targeted messages may include text, images, links to external sources (e.g., webpages, multimedia content, etc.), and the like. In some aspects, message placement engine 124 may use a text classification model (e.g., from an external service or trained by predictive model trainer 114 and deployed to message placement engine 124) to determine whether the targeted message includes appropriate or inappropriate content and thus determine whether the targeted message is eligible for placement by message placement engine 124 in communications generated through application 122. In some aspects, where a targeted message includes multimedia content, message placement engine 124 may examine information about the location from which the multimedia content is served to determine whether the targeted message includes appropriate or inappropriate content. In another aspect, the message placement engine 124 can extract textual content from the multimedia content (e.g., via optical character recognition, speech recognition engines, etc.) and input the extracted textual content into the text classification model for analysis.

In some aspects, where a targeted message includes textual content, message placement engine 124 can generate an appropriateness score for the textual content using a text classification model trained to determine whether the targeted message is appropriate and thus may be placed in communications generated through application 122. If the text classification model generates an appropriateness score for a targeted message that exceeds a threshold score, message placement engine 124 can determine that the targeted message is appropriate for placement and may commit the message to targeted message repository 130 for further processing (e.g., placement with a host party through a bidding process). Otherwise, message placement engine 124 can determine that the targeted message potentially is inappropriate and thus that a manual decision of whether the targeted message is eligible for placement should be made. Message placement engine 124 can commit these targeted messages to targeted message repository 130 for further processing if a manual override is received indicating that these targeted messages are, in fact, appropriate, and can discard these targeted messages if message placement engine 124 receives an indication that the targeted message is, in fact, inappropriate.

In some aspects, where a targeted message includes a reference to an external source (e.g., a uniform resource locator (URL) of a webpage or other content), message placement engine 124 can examine the URL against a safelist of references that can be included in targeted messages. If the reference is on the safelist, then the targeted message may be deemed appropriate for placement in communications generated through application 122. Otherwise, the targeted message may be deemed inappropriate for placement in communications generated through application 122 and discarded. In some aspects, message placement engine 124 can maintain a blocklist of parties that repeatedly attempt to place targeted messages with inappropriate content. If a party attempts to place more than a threshold number of targeted messages including inappropriate content through message placement engine 124, the party may be blocked from submitting further targeted messages for placement through message placement engine 124.

In some aspects, where a text classification model is not deployed to message placement engine 124, message placement engine 124 may provide the targeted message to one or more external services (not shown) for analysis. In such a case, message placement engine 124 may receive an appropriateness score from the one or more external services and can use the received appropriateness score to determine whether to allow the targeted message to be placed in communications generated through application 122 or to discard the targeted message. In some aspects, these external services may be configured to examine both textual content and content associated with references to external sources hosting content to be included in the communications generated through application 122. Message placement engine 124 generally can accept a targeted message for placement through message placement engine 124 if the appropriateness score for such a message exceeds a threshold score and can either determine that a manual decision should be made or discard a targeted message if the appropriateness score falls below the threshold score.

If a message is deemed appropriate for inclusion in communications generated through application 122, message placement engine 124 may proceed to identify prospective host parties for the targeted message. Generally, prospective host parties may be selected based on an effectiveness score generated for a host party, a distance score between the party associated with the targeted message and the host party, and a match score between the party associated with the targeted message and the host party.

The effectiveness score generated for the host party generally indicates an effectiveness of the host party in placing targeted messages that receive engagement from recipients of communications generated through application 122 for the host party. In some embodiments, an effectiveness score may be generated based on a click-through rate for targeted messages placed in communications generated through application 122 for the host party and click-through rates for other host parties through which targeted messages are placed in communications generated through application 122. In some aspects, the effectiveness score may be a decile score indicating an effectiveness of the host party relative to a universe of host parties through which targeted messages are placed. For example, suppose that the click-through rate or other interaction rate with targeted messages placed through the host party is 0.09 (i.e., 9 out of every 100 targeted messages placed in communications generated through application 122 for the host party received user interaction), and that this interaction rate is better than interaction rates associated with 80 percent of host parties, the host party may have an effectiveness score of 8 out of 10.

The distance score calculated for the host party may be based on a location sub-score and an industry sub-score calculated for the host party and the party associated with the targeted message. For example, the location sub-score may be based on postal codes associated with the host party and the party associated with the targeted message, and the industry sub-score may be based on classification codes (e.g., an NAICS code) associated with the host party and the party associated with the targeted message. Generally, these differences may reflect an intuition that many targeted messages will be most effective when (1) placed with host parties that are local to the party associated with the targeted messages and (2) when the host parties and the party associated with the targeted messages serve similar customers. The location sub-score may be calculated as the number of consecutive matching characters in the postal codes associated with the host party and the party associated with the targeted message. For example, suppose that the host party has a postal code of 65346 and the party associated with the targeted message has a postal code of 65348. The number of consecutive matching characters, from the start of each postal code, is thus 4, as both the host party and the party associated with the targeted message has a postal code prefix of "6534."

Similarly, to calculate the industry sub-score, message placement engine 124 can calculate the industry sub-score based on the number of consecutive matching characters in the classification codes associated with the host party and the party associated with the targeted message. Suppose, for example, that the host party has an NAICS code of 54769 and the party associated with the targeted message has an NAICS code of 54790. The number of consecutive matching characters, from the start of each NAICS code, is thus 3, as both the host party and the party associated with the targeted message has a classification code prefix of "547."

Various techniques may be used to generate the distance score based on the postal code sub-score and the industry sub-score. In one example, the postal code sub-score and the industry sub-score may be equally weighted and calculated as a simple sum of the postal code sub-score and the industry sub-score. In another example, user-defined weights may be assigned to the postal code sub-score and the industry sub-score to reflect user preferences to the importance of locality and industry similarity. In yet another example, historical information may be used to determine the weights to assign to the postal code sub-score and the industry sub-score. In such a case, the weights may be selected based on the history of targeted messages hosted by the host party. To do so, an average postal code sub-score and an average industry sub-score may be calculated from the targeted messages hosted by the host party. Weights may be assigned to the postal code sub-score and the industry sub-score based on a comparison of the average postal code sub-score to the average total score and a comparison of the average industry sub-score to the average total score, respectively.

Finally, message placement engine 124 can generate a match score between a host party and the party associated with the targeted message using the match prediction model trained by predictive model trainer 114 and deployed to message placement engine 124. In some aspects, the match score may be calculated as a score between 0 and 1, where values closer to 1 indicate stronger matches between the host party and the party associated with the targeted message.

In some aspects, message placement engine 124 can aggregate the effectiveness score, the distance score, and the matching score to generate an overall score for a prospective host party for the targeted message. Generally, higher scores for a targeted message relative to the prospective host party may indicate a higher likelihood of the prospective host party being an effective host for the targeted message, while lower scores for the targeted message relative to the prospective host party may indicate a lower likelihood of the prospective host party being an effective host for the targeted message. To place messages, message placement engine 124 may present, to a party associated with a targeted message, a set of prospective host parties based on the overall scores associated with each prospective host party in the set of prospective host parties. In some aspects, the set of prospective host parties may be selected as the prospective host parties having overall scores exceeding a threshold value. When the party associated with the targeted message selects a prospective host party for the targeted message, message placement engine 124 can initiate a placement process in which a notification is generated to indicate, to the prospective host party, that a party is interested in placing a targeted message in communications generated through application 122 for the prospective host party. A timer may be started for the prospective host party to agree to host the targeted message and agree on the conditions for hosting the targeted message. If the timer expires, the placement process may fail, and the party associated with the targeted message may select another prospective host party to host the targeted message.

After a host party (e.g., a party who generates communications for transmission to specified recipients through application 122) agrees to host a targeted message (e.g., by agreeing to host the targeted message and on conditions for hosting the targeted message, thereby completing the placement process initiated by message placement engine 124), message placement engine 124 places the targeted message in communications generated by the host party through application 122. In some aspects, message placement engine 124 may place messages in randomly selected communications, may place messages periodically (e.g., in every n communications generated by the host party through application 122), may place messages until the message is placed in a set number of communications, and the like. In some aspects, message placement engine 124 may determine when to place targeted messages based on the inclusion of various words or phrases in the communication generated by the host party through application 122. For example, a targeted message may be associated with defined words or phrases and/or other conditions under which the targeted message will be placed. If a communication includes one or more of the defined words or phrases and/or otherwise meets the conditions defined for the targeted message, message placement engine 124 can inject the targeted message into the communication prior to application 122 outputting the targeted message for transmission to a recipient. For example, suppose that a party associated with the targeted message has defined that the targeted message should only be included in communications that include the phrase "running shoes." Message placement engine 124 may receive requests to place the targeted message from application 122 and may search for the phrase "running shoes" (or variants thereof) in the communications generated by application 122. If the phrase "running shoes" appears in a communication, message placement engine 124 can inject the targeted message in the communication; otherwise, message placement engine 124 may leave the communication as-is and allow application 122 to output the communication for transmission without modification.

Figure 2:
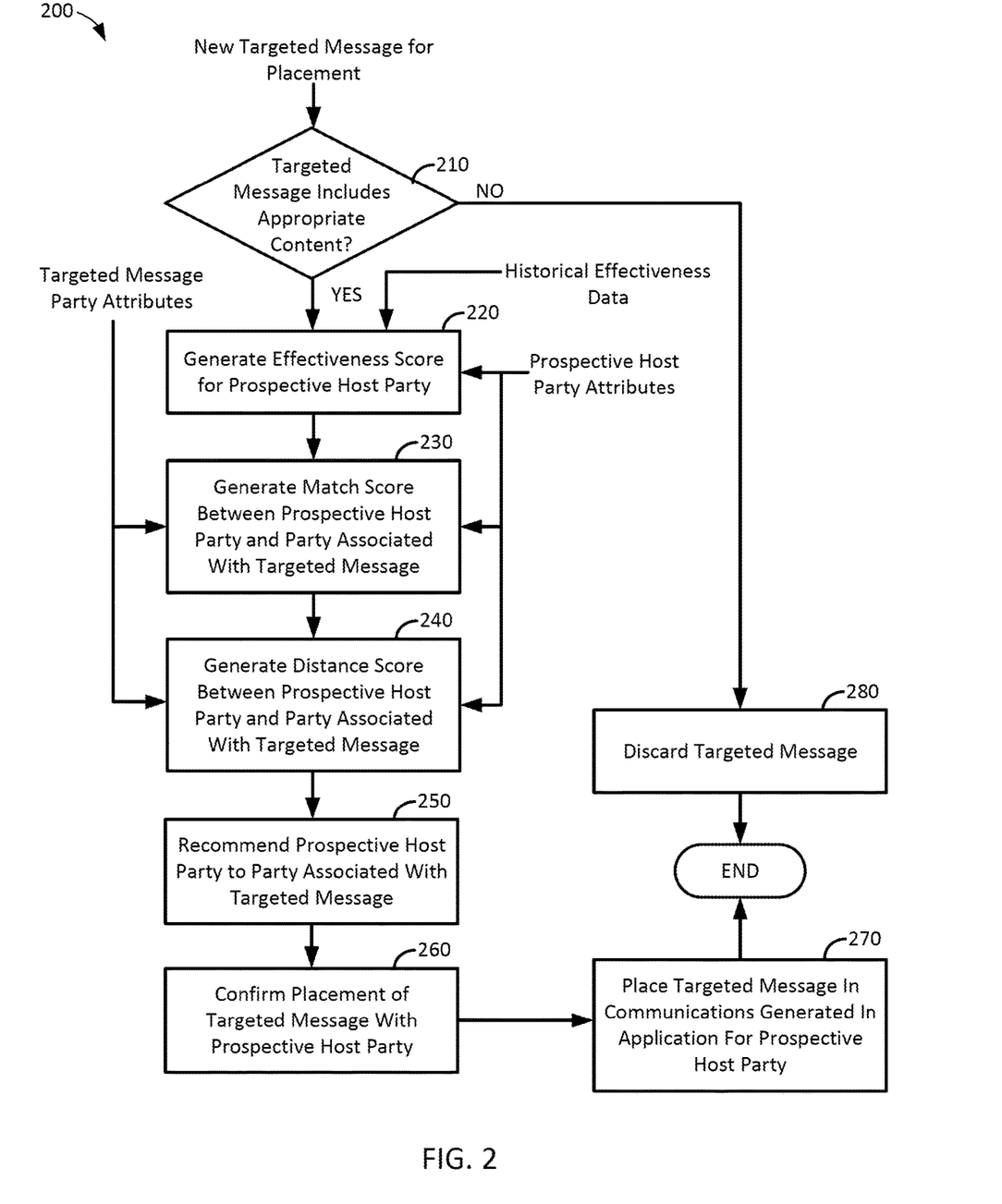
FIG. 2 is a flow chart illustrating the ingestion of a targeted message and placement of the targeted message with a host party for inclusion in communications generated through a software application by the host party.

Example Placement of Targeted Messages In Communications Generated In an Application Using Machine Learning Models FIG. 2 is a flow chart illustrating a targeted message ingestion and placement operation 200 which may be executed by a message placement engine (e.g., message placement engine 124 illustrated in FIG. 1) to place messages with a host party for inclusion in communications generated through a software application by the host party.

As illustrated, a targeted message ingestion and placement operation 200 begins with determining, at block 210, whether a targeted message includes appropriate content for placement through a message placement engine into communications generated by a software application. To determine whether a targeted message includes appropriate content for placement through a message placement engine, a message placement engine can generate an appropriateness score for the targeted message using one or more trained text classifier models trained to classify the textual content associated with a targeted message as appropriate or inappropriate. Generally, appropriate content may be a targeted message that does not include profanity, explicit content, or other content which should not be placed through a message placement engine. Similarly, inappropriate content may include profanity, explicit content, or other content which should not be placed through a message placement engine. In some aspects, where the targeted message is hosted remotely, the message placement engine can examine information about the location of the targeted message (e.g., a URL) and use a safelist of locations to determine whether the message includes appropriate or inappropriate content based on an assumption that such messages may have already been confirmed as appropriate by if these messages are hosted on a location included on the safelist.

If, at block 210, a message placement engine determines that a targeted message includes inappropriate content, operation 200 proceeds to block 280 with discarding the targeted message. By discarding the targeted message, the targeted message may not be eligible for placement—even inadvertently—through the message placement engine. Subsequently, operation 200 terminates.

Otherwise, operation 200 proceeds to block 220 with generating an effectiveness score for the prospective host party. As discussed, the effectiveness score may be generated based on a click-through rate for targeted messages placed in communications generated through an application for the prospective host party and click-through rates for other host parties through which targeted messages are placed in communications generated through the application. The click-through rate for targeted messages placed by each host party, including the prospective host party, may be ordered and divided into groupings (e.g., deciles), and the effectiveness score generated for the host party may be the grouping into which the click-through rate for the prospective host party falls.

At block 230, operation 200 proceeds with generating a match score between a prospective host party and the party associated with the targeted message. As discussed, the match score may be generated by a match prediction machine learning model that is trained to generate a match score based on attributes of the prospective host party and attributes of the party associated with the targeted message. These attributes may include, for example, sales volume information, revenue information, age information, overlap between products offered by the prospective host party and the party associated with the targeted message, industry classification, and other attributes which may influence whether a prospective host party is a potential match for hosting a targeted message. The match prediction machine learning model may be a regression model or other machine learning model that classifies a pairing between a prospective host party and the party associated with the targeted message as a match based on a match score generated by the match prediction machine learning model. The match score may represent a likelihood of a pairing being a match or a non-match, with stronger matches having match scores closer to 1 and stronger non-matches having match scores closer to 0.

At block 240, operation 200 proceeds with generating a distance score between the prospective host party and the party associated with the targeted message. The distance score may be generated based on a location sub-score and an industry sub-score generated for the pairing of the prospective host party and the party associated with the targeted message. Based on an assumption that matching prefix characters indicates an extent to which a location (e.g., a postal code) is similar and an extent to which an industry classification code is similar for the prospective host party and the party associated with the targeted message, it may be assumed that higher distance scores indicate a closer distance between the prospective host party and the party associated with the targeted message than lower distance scores.

While blocks 220, 230, and 240 are illustrated in FIG. 2 as sequential operations, it should be understood that blocks 220, 230, and 240 may alternatively be performed in parallel, or substantially in parallel.

At block 250, operations 200 proceed with recommending a prospective host party to the party associated with the targeted message. Generally, in recommending the prospective host party, a message placement engine can generate a set of prospective host parties with the highest aggregate effectiveness, match, and distance scores as the hosts which are most likely to effectively place the targeted message. The party associated with the targeted message can select a prospective host party to host the targeted message, which may start a placement process with an expiry time.

At block 260, operations proceed with confirming placement of the targeted message with the prospective host party. Generally, confirming placement of the targeted message may include receiving, from one or both of the prospective host party or the party associated with the targeted message, information indicating that the parties have agreed to placement of the targeted message in communications generated by an application for the prospective host party and to conditions under which the targeted message is placed. The confirmation may be received prior to the expiry time for the placement process; otherwise, the party associated with the targeted message may attempt to place the targeted message with a different prospective host party.

At block 270, operations proceed with placing the targeted message in communications generated in an application for the prospective host party. As discussed, the message placement engine may place the targeted message in communications generated in the application for the prospective host party based on various conditions defined for such placement. In one example, the communications may be placed in a designated area (e.g., a messaging pane) of a communication generated in the application, such as otherwise blank space in an invoice or other areas in which targeted messages can be placed.

Example Methods for Placing Targeted Messages Using the Machine Learning Models

Figure 3:
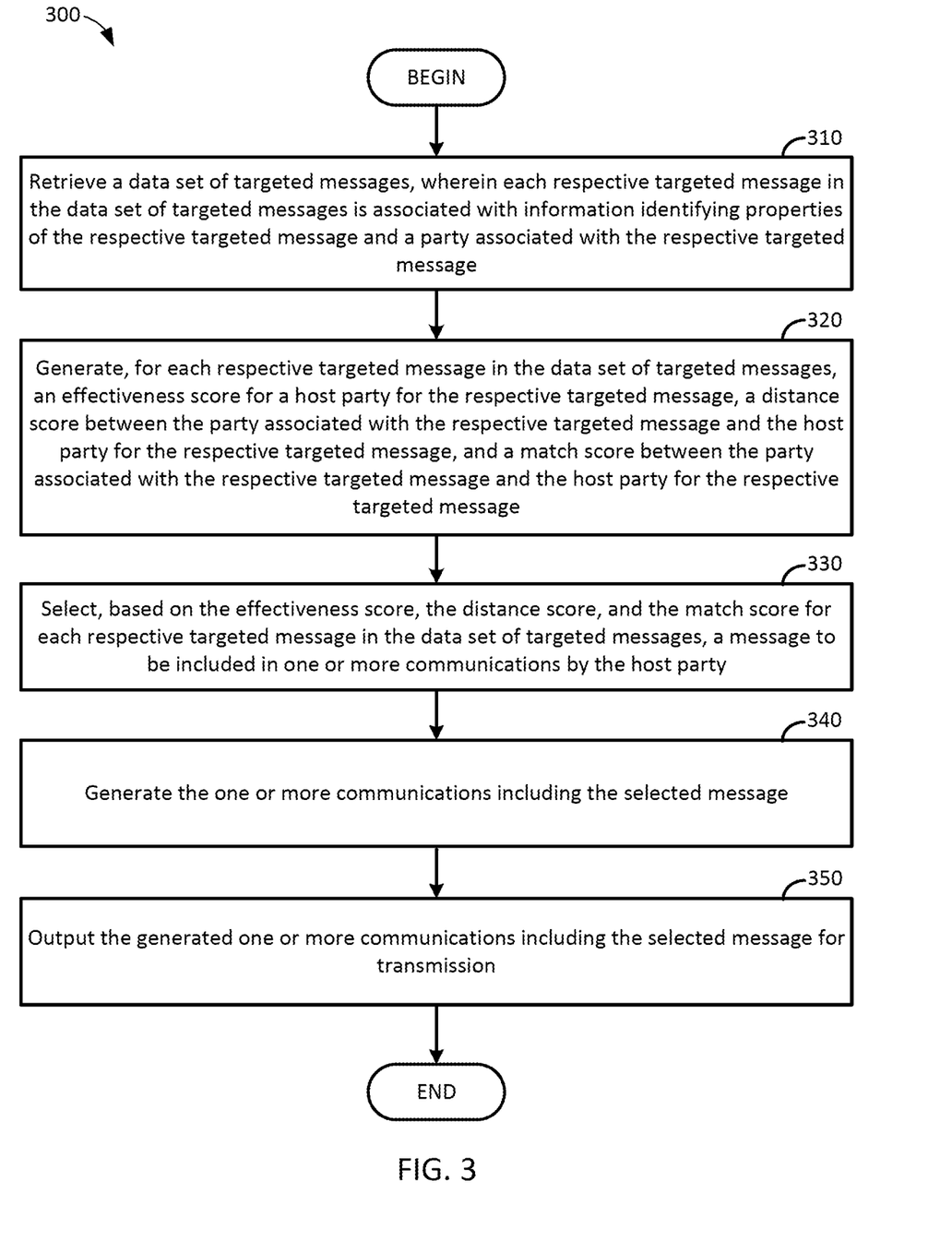
FIG. 3 illustrates example operations for presenting targeted messages to users of a software application based on machine learning models trained to identify hosts for targeted messages based on effectiveness, distance, and match scores associated with targeted messages.

FIG. 3 illustrates example operations 300 that may be performed to place targeted messages with host parties for these targeted messages, in accordance with aspects of the present disclosure. Operations 300 may be performed, for example, by application 122 and/or message placement engine 124 of application server 120 illustrated in FIG. 1 or other computing devices on which messages can be placed in communications generated by an application executing on the computing devices.

As illustrated, operations 300 begin at block 310 with retrieving a data set of targeted messages. Each respective targeted message in the data set of targeted messages is associated with information identifying properties of the respective targeted message and a party associated with the respective targeted message.

At block 320, operations 300 proceed with generating, for each respective targeted message in the data set of targeted messages, an effectiveness score for a host party for the respective targeted message (e.g., a user of an application, such as application 122 illustrated in FIG. 1, which generates communications in which targeted messages can be included), a distance score between the party associated with the respective targeted message and the host party for the respective targeted message, and a match score between the party associated with the respective targeted message and the host party for the respective targeted message.

In some aspects, generating the effectiveness score for the host party for the respective targeted message includes calculating an interaction rate for targeted messages previously placed with the host party. In one aspect, a decile score is generated based on the calculated interaction rate for targeted messages previously placed with the host party, relative to calculated interaction rates for targeted messages previously placed with other parties.

In some aspects, generating the distance score between the party associated with the respective targeted message and the host party for the respective targeted message includes calculating a first distance and a second distance. In one aspect, the first distance is calculated between an industry code of the party associated with the respective targeted message and an industry code of the host party, and the second distance is calculated between a location identifier of the party associated with the respective targeted message and a location identifier of the host party. The distance score is generated based on the first distance and the second distance.

In some aspects, the distance score is generated based on equal weights assigned to the first distance and the second distance.

In some aspects, the distance score is generated based on user-defined weights assigned to the first distance and the second distance.

In some aspects, the distance score is calculated based on a first weight assigned to the first distance and a second weight assigned to the second distance. The first weight and the second weight may be calculated based on historical data associated with targeted messages previously placed with the host party. For example, the first weight and the second weight may be calculated based on the proportion of an average total score that is associated with an average location distance score and an average industry classification distance score, respectively.

In some aspects, generating the match score between the party associated with the respective targeted message and the host party for the respective targeted message includes generating a match score based on a regression model and an input including a first feature data set extracted from historical targeted messages placed for the host party and a second feature data set from a randomly selected set of historical targeted messages. A number of entries in the first feature data set may, in some aspects, match a number of entries in the second feature data set.

At block 330, operations 300 proceed with selecting, based on the effectiveness score, the distance score, and the match score for each respective targeted message in the data set of targeted messages, a message to be included in one or more communications by the host party.

At block 340, operations 300 proceed with generating the one or more communications including the selected message. In some aspects, generating the one or more communications including the selected message is based on detecting, in the one or more communications, one or more words triggering inclusion of the selected message in the one or more communications.

At block 350, operations 300 proceed with outputting the generated one or more communications including the selected message for transmission.

In some aspects, a new targeted message is received for inclusion in a repository of messages for selection by one or more other parties (e.g., for hosting in communications generated through an application for these one or more other parties). Text associated with the new targeted message is retrieved, and an appropriateness score is generated for the received text based on a machine learning model trained to classify an input text as including appropriate or inappropriate content. The new targeted message is committed to the repository based on the generated appropriateness score. In some aspects, committing the new targeted message to the repository includes committing the new targeted message to the repository based on determining that the appropriateness score exceeds a threshold value. As discussed, if the appropriateness score is less than the threshold value, then the new targeted message may be placed on hold for manual review or automatically rejected.

Figure 4:
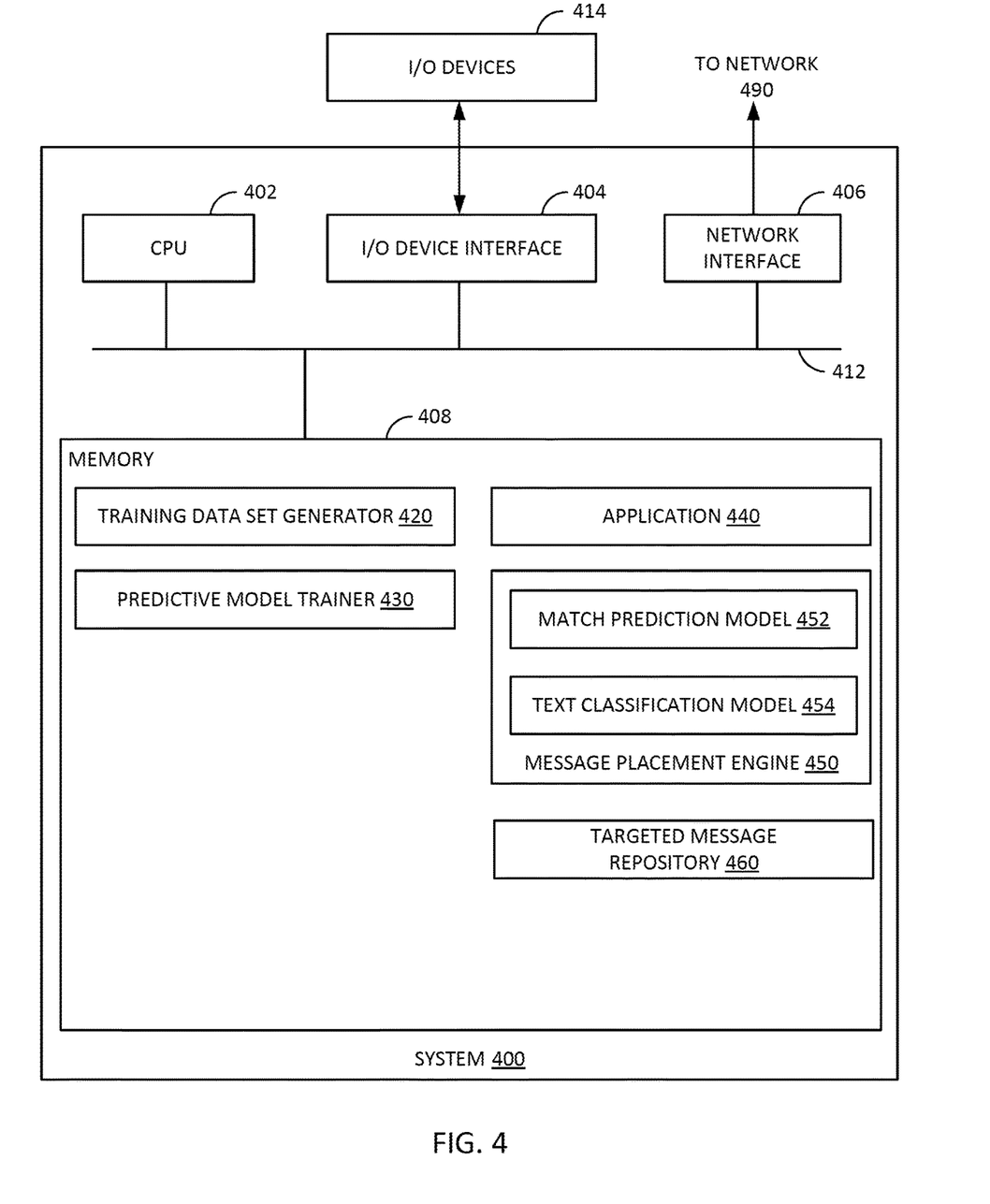
FIG. 4 illustrates an example system on which embodiments of the present disclosure can be performed.

Example Systems for Training Machine Learning Models and Placing Targeted Messages Using the Machine Learning Models FIG. 4 illustrates an example system 400 in which predictive risk models are trained and used to place targeted messages in communications generated by a software application for users of the software application. System 400 may correspond to one or both of model training system 110 and application server 120 illustrated in FIG. 1. In some aspects, system 400 may perform the methods as described with respect to FIGS. 2 and 3.

As shown, system 400 includes a central processing unit (CPU) 402, one or more I/O device interfaces 404 that may allow for the connection of various I/O devices 414 (e.g., keyboards, displays, mouse devices, pen input, etc.) to the system 400, network interface 406 through which system 400 is connected to network 490 (which may be a local network, an intranet, the internet, or any other group of computing devices communicatively connected to each other), a memory 408, and an interconnect 412.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, and memory 408.

CPU 402 is included to be representative of a single CPU, multiple CPUs, a single CPU having multiple processing cores, and the like.

Memory 408 is representative of a volatile memory, such as a random access memory, or a nonvolatile memory, such as nonvolatile random access memory, phase change random access memory, or the like. As shown, memory 408 includes a training data set generator 420, predictive risk model trainer 430, application 440, message generation engine 450, and targeted message repository 460.

Training data set generator 420 generally corresponds to training data set generator 112 illustrated in FIG. 1. Generally, training data set generator 420 uses information about targeted messages from targeted message repository 460 to generate one or more training data sets. The one or more training data sets may include a training data set for training a match prediction model that determines a likelihood that a party will be an effective host for targeted messages associated with a user of application 440. Generally, the training data set for training the match prediction model generated by training data set generator 420 may include a plurality of features characterizing parties associated with the targeted messages and a plurality of features characterizing parties hosting the targeted messages. The one or more training data sets may, in some aspects, include a training data set used to train a text classification model to classify the textual content of targeted messages as appropriate or inappropriate.

Predictive model trainer 430 generally corresponds to predictive model trainer 114 illustrated in FIG. 1. Generally, predictive model trainer 430 uses the training data sets generated by training data set generator 420 to train one or more predictive models. The one or more predictive models may include a match prediction model 452, which may be trained to predict a likelihood that a party will be an effective host for targeted messages associated with a user of application 440, and a text classification model 454 trained to classify textual content in a targeted message as appropriate or inappropriate.

Application 440 generally corresponds to application 122 illustrated in FIG. 1. Generally, application 440 receives requests from users of the application 440 (who may be host parties for targeted messages associated with other users of the application 440) for various features or functionality of the application and generates communications in which targeted messages may be included. Application 440 generally subsequently outputs the communications, along with any targeted messages placed by message generation engine 450, to designated recipients for these communications.

Message placement engine 450 generally corresponds to message generation engine 124 illustrated in FIG. 1. Generally, message placement engine 450 uses the predictive models trained by predictive model trainer 430 to place targeted messages in communications generated by application 340. Message placement engine 450 generally uses a text classification model 454 to determine whether a targeted message includes appropriate or inappropriate text. If a targeted message includes appropriate text, message placement engine 450 calculates an effectiveness score for prospective host parties for the targeted message, a distance score between prospective host parties and the party associated with the targeted message, and a match score between prospective host parties and the party associated with the targeted message. Based on the effectiveness score, distance score, and match score, message placement engine 450 can generate a set of prospective host parties for the party associated with the targeted message to select for hosting the targeted message. When a selected host party generates a communication, message placement engine 450 injects the targeted message into the communication prior to application 440 outputting the communication for transmission to the designated recipient.

Note that FIG. 4 is just one example of a system, and other systems including fewer, additional, or alternative components are possible consistent with this disclosure.

EXAMPLE CLAUSES

Implementation examples are described in the following numbered clauses:

Clause 1: A method, comprising: retrieving, from a repository, a data set of targeted messages, wherein each respective targeted message in the data set of targeted messages is associated with information identifying properties of the respective targeted message and a party associated with the respective targeted message; generating, for each respective targeted message in the data set of targeted messages, an effectiveness score for a host party for the respective targeted message, a distance score between the party associated with the respective targeted message and the host party for the respective targeted message, and a match score between the party associated with the respective targeted message and the host party for the respective targeted message; selecting, based on the effectiveness score, the distance score, and the match score for each respective targeted message in the data set of targeted messages, a message to be included in one or more communications by the host party; generating the one or more communications including the selected message; and outputting the generated one or more communications including the selected message for transmission.

Clause 2: The method of Clause 1, wherein generating the effectiveness score for the host party for the respective targeted message comprises: calculating an interaction rate for targeted messages previously placed with the host party; and generating a decile score based on the calculated interaction rate for targeted messages previously placed with the host party, relative to calculated interaction rates for targeted messages previously placed with other parties.

Clause 3: The method of any one of Clauses 1 or 2, wherein generating the distance score between the party associated with the respective targeted message and the host party for the respective targeted message comprises: calculating a first distance between an industry code of the party associated with the respective targeted message and an industry code of the host party; calculating a second distance between a location identifier of the party associated with the respective targeted message and a location identifier of the host party; and generating the distance score based on the first distance and the second distance.

Clause 4: The method of Clause 3, wherein generating the distance score comprises generating a score with equal weights assigned to the first distance and the second distance.

Clause 5: The method of any one of Clauses 3 or 4, wherein generating the distance score comprises generating a score with user-defined weights assigned to the first distance and the second distance.

Clause 6: The method of any one of Clauses 3 through 5, further comprising: calculating a first weight assigned to the first distance and a second weight assigned to the second distance based on historical data associated with targeted messages previously placed by the host party, wherein generating the distance score comprises generating a score based on the first weight, the first distance, the second weight, and the second distance.

Clause 7: The method of any one of Clauses 1 through 6, wherein generating the match score between the party associated with the respective targeted message and the host party for the respective targeted message comprises generating a match score based on a regression model and an input including a first feature data set extracted from historical targeted messages placed for the host party and a second feature data set from a randomly selected set of historical targeted messages.

Clause 8: The method of Clause 7, wherein a number of entries in the first feature data set matches a number of entries in the second feature data set.

Clause 9: The method of any one of Clauses 1 through 8, wherein generating the one or more communications including the selected message is based on detecting, in the one or more communications, one or more words triggering inclusion of the selected message in the one or more communications.

Clause 10: The method of any one of Clauses 1 through 9, further comprising: receiving a new targeted message to be included in the repository for selection by one or more other parties; retrieving text associated with the new targeted message; generating an appropriateness score for the received text based on a machine learning model trained to classify an input text as including appropriate or inappropriate content; and committing the new targeted message to the repository based on the generated appropriateness score.

Clause 11: The method of Clause 10, wherein committing the new targeted message to the repository based on the generated appropriateness score comprises committing the new targeted message to the repository based on determining that the appropriateness score exceeds a threshold value.

Clause 12: A system, comprising: a memory having executable instructions stored thereon; and a processor configured to execute the executable instructions to perform the methods of any one of Clauses 1 through 11.

Clause 13: A system, comprising: means for performing the methods of any one of Clauses 1 through 11.

Clause 14: A computer-readable medium having instructions stored thereon which, when executed by a processor, performs the methods of any one of Clauses 1 through 11.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    retrieving, from a repository, a data set of targeted messages, wherein each respective targeted message in the data set of targeted messages is associated with information identifying properties of the respective targeted message and a party associated with the respective targeted message;
    generating, for each respective targeted message in the data set of targeted messages, an effectiveness score for a host party for the respective targeted message, a distance score between the party associated with the respective targeted message and the host party for the respective targeted message, and a match score between the party associated with the respective targeted message and the host party for the respective targeted message, wherein generating the distance score between the party associated with the respective targeted message and the host party for the respective targeted message comprises calculating a first distance between an industry code of the party associated with the respective targeted message and an industry code of the host party based on a number of consecutive matching characters in the industry codes;
    selecting, based on the effectiveness score, the distance score, and the match score for each respective targeted message in the data set of targeted messages, a message to be included in one or more communications by the host party;
    generating the one or more communications including the selected message; and
    outputting the generated one or more communications including the selected message for transmission.

2. The method of claim 1, wherein generating the effectiveness score for the host party for the respective targeted message comprises:
    calculating an interaction rate for targeted messages previously placed with the host party; and
    generating a decile score based on the calculated interaction rate for targeted messages previously placed with the host party, relative to calculated interaction rates for targeted messages previously placed with other parties.

3. The method of claim 1, wherein generating the distance score between the party associated with the respective targeted message and the host party for the respective targeted message further comprises:
  calculating a second distance between a location identifier of the party associated with the respective targeted message and a location identifier of the host party; and
  generating the distance score based on the first distance and the second distance.

4. The method of claim 3, wherein generating the distance score comprises generating a score with equal weights assigned to the first distance and the second distance.

5. The method of claim 3, wherein generating the distance score comprises generating a score with user-defined weights assigned to the first distance and the second distance.

6. The method of claim 3, further comprising:
  calculating a first weight assigned to the first distance and a second weight assigned to the second distance based on historical data associated with targeted messages previously placed with the host party,
  wherein generating the distance score comprises generating a score based on the first weight, the first distance, the second weight, and the second distance.

7. The method of claim 1, wherein generating the match score between the party associated with the respective targeted message and the host party for the respective targeted message comprises generating a match score based on a regression model and an input including a first feature data set extracted from historical targeted messages placed for the host party and a second feature data set from a randomly selected set of historical targeted messages.

8. The method of claim 7, wherein a number of entries in the first feature data set matches a number of entries in the second feature data set.

9. The method of claim 1, wherein generating the one or more communications including the selected message is based on detecting, in the one or more communications, one or more words triggering inclusion of the selected message in the one or more communications.

10. The method of claim 1, further comprising:
  receiving a new targeted message to be included in the repository for selection by one or more other parties;
  retrieving text associated with the new targeted message;
  generating an appropriateness score for the received text based on a machine learning model trained to classify an input text as including appropriate or inappropriate content; and
  committing the new targeted message to the repository based on the generated appropriateness score.

11. The method of claim 10, wherein committing the new targeted message to the repository based on the generated appropriateness score comprises committing the new targeted message to the repository based on determining that the appropriateness score exceeds a threshold value.

12. A system, comprising:
  a memory having executable instructions stored thereon; and
  a processor configured to execute the executable instructions to cause the system to:
    retrieve, from a repository, a data set of targeted messages, wherein each respective targeted message in the data set of targeted messages is associated with information identifying properties of the respective targeted message and a party associated with the respective targeted message;
    generate, for each respective targeted message in the data set of targeted messages, an effectiveness score for a host party for the respective targeted message, a distance score between the party associated with the respective targeted message and the host party for the respective targeted message, and a match score between the party associated with the respective targeted message and the host party for the respective targeted message, wherein generating the distance score between the party associated with the respective targeted message and the host party for the respective targeted message comprises calculating a first distance between an industry code of the party associated with the respective targeted message and an industry code of the host party based on a number of consecutive matching characters in the industry codes;
    select, based on the effectiveness score, the distance score, and the match score for each respective targeted message in the data set of targeted messages, a message to be included in one or more communications by the host party;
    generate the one or more communications including the selected message; and
    output the generated one or more communications including the selected message for transmission.

13. The system of claim 12, wherein in order to generate the effectiveness score for the host party for the respective targeted message, the processor is configured to cause the system to:
  calculate an interaction rate for targeted messages previously placed with the host party; and
  generate a decile score based on the calculated interaction rate for targeted messages previously placed with the host party, relative to calculated interaction rates for targeted messages previously placed with other parties.

14. The system of claim 12, wherein in order to generate the distance score between the party associated with the respective targeted message and the host party for the respective targeted message, the processor is configured to cause the system to further:
  calculate a second distance between a location identifier of the party associated with the respective targeted message and a location identifier of the host party; and
  generate the distance score based on the first distance and the second distance.

15. The system of claim 14, wherein the processor is further configured to cause the system to:
  calculate a first weight assigned to the first distance and a second weight assigned to the second distance based on historical data associated with targeted messages previously placed by the host party,
  wherein in order to generate the distance score, the processor is configured to cause the system to generate a score based on the first weight, the first distance, the second weight, and the second distance.

16. The system of claim 12, wherein in order to generate the match score between the party associated with the respective targeted message and the host party for the respective targeted message, the processor is configured to generate a match score based on a regression model and an input including a first feature data set extracted from historical targeted messages placed for the host party and a second feature data set from a randomly selected set of historical targeted messages.

17. The system of claim 12, wherein in order to generate the one or more communications including the selected message, the processor is configured to cause the system to generate the one or more communications based on detecting, in the one or more communications, one or more words triggering inclusion of the selected message in the one or more communications.

18. The system of claim 12, wherein the processor is further configured to:
- receive a new targeted message to be included in the repository for selection by one or more other parties;
- retrieve text associated with the new targeted message;
- generate an appropriateness score for the received text based on a machine learning model trained to classify an input text as including appropriate or inappropriate content; and
- commit the new targeted message to the repository based on the generated appropriateness score.

19. The system of claim 18, wherein in order to commit the new targeted message to the repository based on the generated appropriateness score, the processor is configured to cause the system to commit the new targeted message to the repository based on determining that the appropriateness score exceeds a threshold value.

20. A method, comprising:
- retrieving, from a repository, a data set of targeted messages, wherein each respective targeted message in the data set of targeted messages is associated with information identifying properties of the respective targeted message and a party associated with the respective targeted message;
- generating, for each respective targeted message in the data set of targeted messages, an effectiveness score for a host party for the respective targeted message, a distance score between the party associated with the respective targeted message and the host party for the respective targeted message, and a match score between the party associated with the respective targeted message and the host party for the respective targeted message, wherein generating the distance score between the party associated with the respective targeted message and the host party for the respective targeted message comprises calculating a first distance between an industry code of the party associated with the respective targeted message and an industry code of the host party based on a number of consecutive matching characters in the industry codes;
- selecting, based on the effectiveness score, the distance score, and the match score for each respective targeted message in the data set of targeted messages, a message to be included in one or more communications by the host party;
- detecting, in one or more communications, one or more words triggering inclusion of the selected message in the one or more communications;
- generating the one or more communications including the selected message based on detecting the one or more words triggering inclusion of the selected message in the one or more communications; and
- outputting the generated one or more communications including the selected message for transmission.

* * * * *